United States Patent
Hua et al.

(10) Patent No.: US 7,421,455 B2
(45) Date of Patent: Sep. 2, 2008

(54) VIDEO SEARCH AND SERVICES

(75) Inventors: Xian-Sheng Hua, Beijing (CN); Feng Wu, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/276,364

(22) Filed: Feb. 27, 2006

(65) Prior Publication Data

US 2007/0203942 A1  Aug. 30, 2007

(51) Int. Cl.
G06F 17/00 (2006.01)
(52) U.S. Cl. ...................... 707/104.1; 707/101; 707/102
(58) Field of Classification Search .................... 707/3, 707/104.1; 715/515; 725/115; 386/52
See application file for complete search history.

(56) References Cited

U.S. PATENT DOCUMENTS

| | | | |
|---|---|---|---|
| 5,884,056 A | 3/1999 | Steele | |
| 5,987,211 A | 11/1999 | Abecassis | |
| 6,118,923 A | 9/2000 | Rodriguez | |
| 6,278,446 B1 | 8/2001 | Liou et al. | |
| 6,829,781 B1 | 12/2004 | Bhagavath et al. | |
| 6,956,573 B1 | 10/2005 | Bergen et al. | |
| 6,961,731 B2 | 11/2005 | Holbrook | |
| 7,055,168 B1 | 5/2006 | Errico et al. | |
| 2004/0244047 A1* | 12/2004 | Shinkai et al. | 725/115 |
| 2005/0149557 A1* | 7/2005 | Moriya et al. | 707/104.1 |
| 2005/0198570 A1* | 9/2005 | Otsuka et al. | 715/515 |
| 2006/0064716 A1 | 3/2006 | Sull et al. | |
| 2006/0098941 A1* | 5/2006 | Abe et al. | 386/52 |
| 2006/0107289 A1 | 5/2006 | DeYonker et al. | |
| 2006/0107301 A1 | 5/2006 | Leibbrandt et al. | |
| 2006/0129909 A1 | 6/2006 | Butt et al. | |

OTHER PUBLICATIONS

Bailer et al., "Content based Video Retrieval and Summarization using MPEG-7" Available at http://www.joanneum.ac.at/cms_img/img1958.pdf
He et al., "Auto Summarization of Audio-Video Presentations" Available from http://delivery.acm.org/10.1145/320000/319691/p489-he.pdf?key1=319691&key2=5034270511&coll=GUIDE&dl=GUIDE&CFID=73993701&CFTOKEN=48963232.
Smith et al., "An Image and Video Search Engine for the World-Wide Web" Available from http://www.ee.columbia.edu/dvmm/publications/97/smith96g.pdf.
Toklu et al., "Videoabstract: A Hybrid Approach to Generate Semantically Meaningful Video Summaries" Available at, http://ieeexplore.ieee.org/xpl/abs_free.jsp?arNumber=871012.

* cited by examiner

Primary Examiner—Sana Al-Hashemi
(74) Attorney, Agent, or Firm—Lee & Hayes, PLLC

(57) ABSTRACT

Arrangements and methods are described that provide organization of motion image data. In one exemplary implementation, a metadata file is stored in a memory of a computing device. The metadata file includes metadata derived from motion image data. The metadata may include at least a genre associated with the motion image data and a semantic attribute related to the motion image data. The metadata is capable of facilitating text-based searching operations to locate one or more motion image data associated with the metadata.

19 Claims, 9 Drawing Sheets

VIDEO SEARCH AND SERVICES

BACKGROUND

Still and motion image video content is very prevalent on the Internet. Video content is typically stored in a standardized imaging format, for example, (Joint Photographic Experts Group) JPEG, (Moving Picture Expert Group) MPEG-1, MPEG-2, and MPEG-4. Existing text-based Internet searching technologies are typically unable to effectively search the increasing wealth of video content offered by the Internet. Therefore, locating and accessing video content is not easily achieved.

SUMMARY

Arrangements and methods are described that provide organization of motion image data. The organization of the motion image data makes it possible to search the data using a text-based search engine. In one exemplary implementation, motion image data is analyzed and classified based on genre. The classified motion image data is structured by content analysis tools. These content analysis tools segment the classified motion image data into a multilayer structure. The multilayer structure may include shots, scenes and chapters derived from the classified motion image data. Each element in the multilayer structure is processed by semantic classification tools to automatically determine associated text annotations that are representative of semantic properties of the multilayer structure. The text annotations are added to a metadata file that is linked to the classified motion image data. In one implementation, image elements of the multiplayer structure serve as a basis for creating static and/or dynamic thumbnails. These thumbnails may be used as illustrative search results on a user interface.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

The following disclosure describes a motion image processing arrangement and method capable of processing one or more motion image data. The description related to the image processing arrangement is intended to provide a broad contextual overview related preparing motion image data that is searchable using a text-based search engine. In one implementation, a number of units, implemented as software and/or hardware, prepare motion image data so that is may be queried using a text-based search engine. An image categorizer receives motion image data and classifies the received data as being related to a particular genre. The classified image motion data is passed to an image structuring unit. The image structuring unit segments the classified motion image data into at least shots and scenes. These shots and scenes are analyzed by a semantic description unit that produces semantic descriptions related to the shots and scenes. These semantic descriptions may be stored in an active text metadata file that is associated with the received motion image data. An annotation unit facilitates the storage of the genre data and semantic descriptions in the active text metadata file. A thumbnail unit is provided that is capable of producing both static and dynamic thumbnails that are associated with one or more of the shots and scenes. The thumbnail unit may be part of the annotation unit, or a unit external of the annotation unit. In one implementation, such thumbnails are used by a user to access underlying shots and/or scenes.

Exemplary Arrangement

Figure 1:
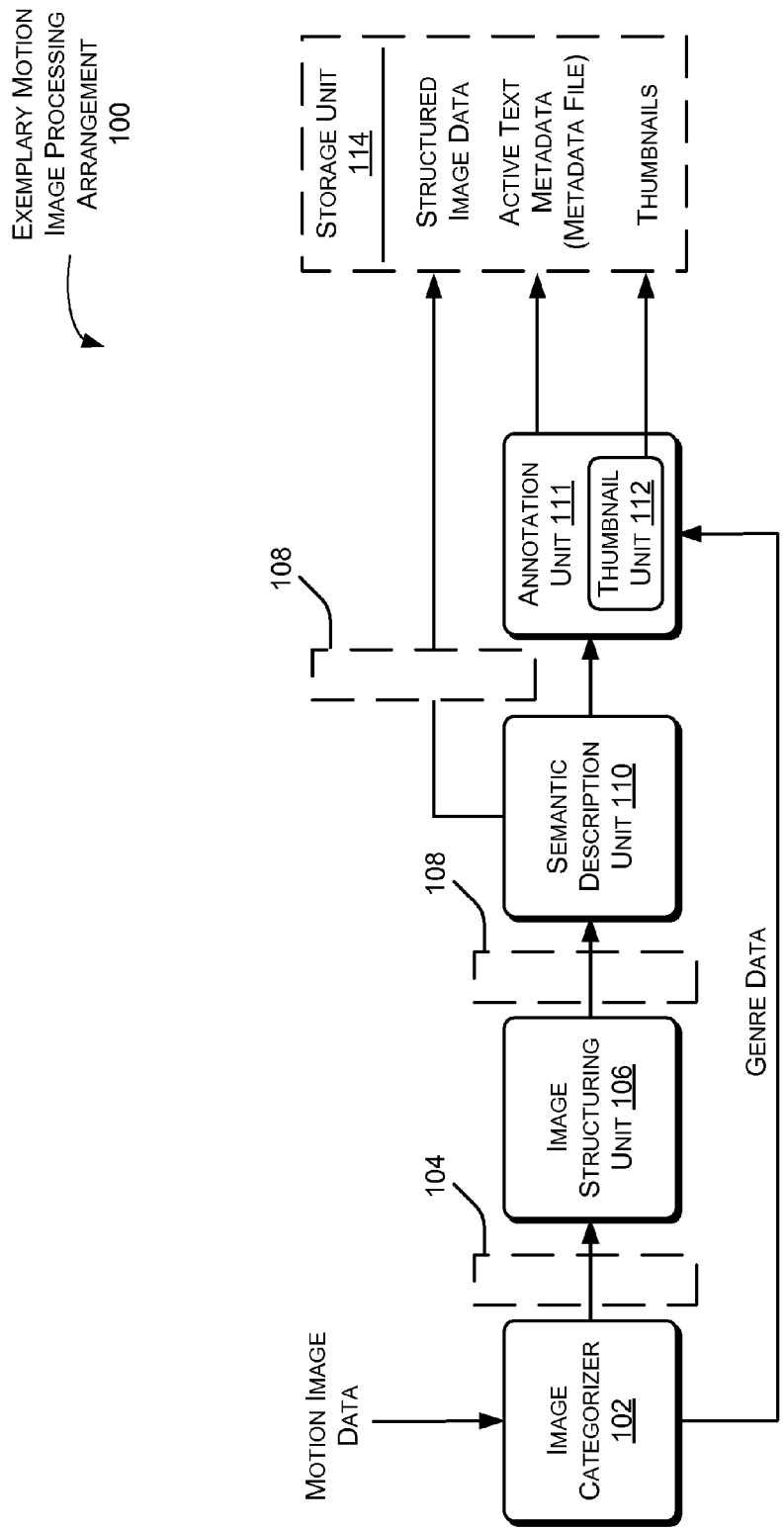
FIG. 1 illustrates an exemplary motion image data processing arrangement. The arrangement includes an image categorizer, an image structuring unit, a semantic description unit and an annotation unit. The arrangement may be used to prepare motion image data for query using a text-based search engine.

FIG. 1 illustrates an exemplary motion image processing arrangement 100 that may be used to prepare motion image data for query using a text-based search engine (not shown). The image processing arrangement 100 is comprised of a number of units that may be implemented in hardware or software, or a combination of hardware and software. Such software may be in the form of computer-executable instructions (program modules) that are executed by one or more associated computing devices. Program modules generally include routines, programs, objects, components, data structures, etc., that perform particular tasks or implement particular abstract data types.

Figure 9:
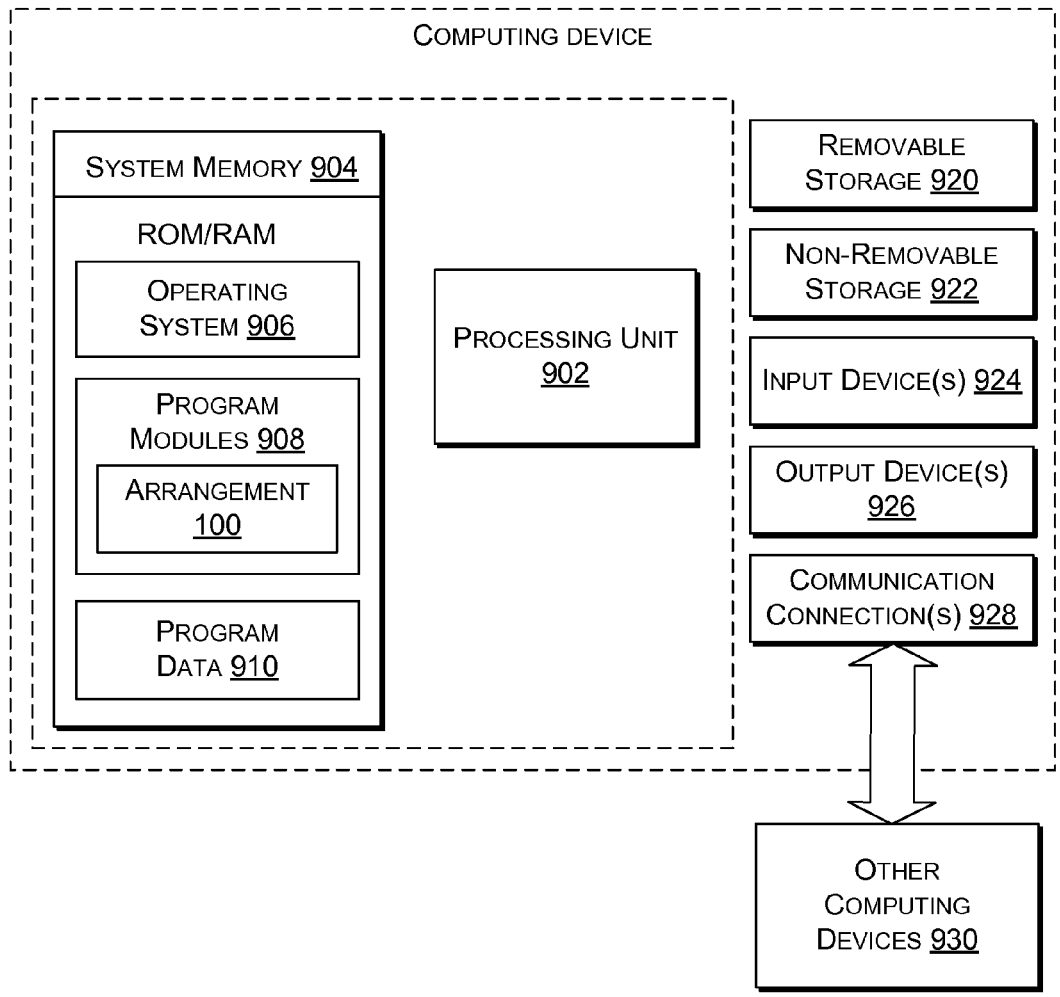
FIG. 9 is a block diagram illustrating exemplary functional components in a computing device that might be used to implement various computing devices discussed herein, according to one embodiment.

The units of the motion image processing arrangement 100 may be realized in a computing device or in a plurality of computing devices. Such computing devices include personal computers, server devices, or portable computing devices. These computing devices may be interface with the Internet. An exemplary computing device that may be used to implement the motion image processing arrangement 100 is illustrated in FIG. 9.

Active text metadata created by the image processing arrangement 100 may be used in conjunction with a text-based search engine to produce useful query results for use by one or more users of the search engine. The active metadata may be incorporated in a metadata file that is associated with motion image data that is processed by the motion image processing arrangement 100. Such a metadata file may be an already-existing metadata file, or such a metadata file may be created by the arrangement 100 after processing of motion image data is complete. In one implementation, the image processing arrangement 100 generates thumbnails that are linked to the active text metadata. The thumbnails may be used to graphically display the structured image data produced by the arrangement 100. The thumbnails may be static images and/or dynamic images that incorporate motion imaging (e.g., video snippets).

The motion image processing arrangement 100 includes an image categorizer 102 that is capable of receiving motion image data. This motion image data may be compressed or uncompressed motion image data. The motion image data may be distributed by one or more content providers in the form of television programs, such as, news shows, movies, sitcoms, comedies, talk shows, sporting events, and so on. The motion image data may also originate from a video camera, video player, and so on. Popular motion image data formats that may be received by the image categorizer 102 include: Motion (Joint Photographic Experts Group) JPEG, (Moving Picture Expert Group) MPEG-1, MPEG-2, MPEG-4 formats, (Windows Media Video) WMV, (Real Video) RM, and (QuickTime Movie) MOV. Many other motion image data formats may be used with the implementations described herein. That image categorizer 102 processes received motion image data as if it were a first in, first out (FIFO) queue. Therefore, the categorizer 102 may employ a buffer to temporarily store motion image data that cannot be immediately processed by the categorizer 102. Alternatively, the image categorizer 102 may parallel process received motion image data using multiple threads, processors, and/or machines. However, each received motion image data is independently processed by the image categorizer 102.

The image categorizer 102 is designed to identify a genre of received motion image data. The genre of the received motion image data may be considered the broad class to which the data may belong (e.g., news, sports, structure, etc.). These broad classes may have a number of genre subclasses. For example, to name a few, the genre sports may have associated subclasses: soccer, football, baseball, or rugby.

Known genre identifying technologies may be used by the image categorizer 102 to identify a genre of the received motion image data. These technologies often start by analyzing motion image data to collect basic acoustic and visual statistics. Then, the image data is analyzed to determine style attributes that may include scene length, camera motion intensity, and color histograms for caption detection. Such technologies may also divide the acoustic data into speech, music and noise. Finally, the distribution if these style attributes are used to derive a genre and possible subclass genres associated with motion image data being processed by the image categorizer 102.

An output 104 from the image categorizer 102 is the motion image data that was processed by the categorizer 102 and associated genre and subclass genres (if appropriate). The output data 104 will be discussed in further detail hereinafter, in connection with FIG. 2. The associated genre and subclass genres may be included in a metadata file that is linked to the motion image data processed by the image categorizer 102. This associated genre and subclass genres data comprises at least part of the active text metadata produced by the motion image processing arrangement 100.

In one implementation, the genre and subclass genre data is passed directly to an annotation unit 111. The annotation unit 111 collects active text metadata and writes the metadata to a metadata file associated with particular motion image data. Moreover, a thumbnail unit 112 associated with the annotation unit 111 may generate static and/or dynamic thumbnails. The thumbnail unit 112 may be implemented external of the annotation unit 111 as well. In general, the thumbnail unit 112 may be implemented at any point after an image structuring unit 106 (discussed below). Further discussion of the annotation unit 111 and the thumbnail unit 112 is provided later herein.

The image structuring unit 106 receives motion image data after it is processed by the image categorizer 102. Generally, the image structuring unit 106 is designed to structure received motion image data into a number of distinct categories. These distinct categories may include shots, scenes and chapters derived from the received motion image data. Each generated distinct category may be linked to a static and/or dynamic thumbnail. Thumbnails are discussed in greater detail later.

The image structuring unit 106 collects motion information, spatial information, colors from image scenery (e.g., landscape, building structures, etc.) and attributes associated with humans and objects for each frame of the motion image data. The image structuring unit 106 groups a number of the frames into a sequence of shots based on this collected information. Each shot may have a varying number of frames. The image structuring unit 106 defines how many frames are associated with each shot based on whether or not a significant visual change occurs between successive frames.

As was explained in the preceding text, a shot may be comprised of just a few frames or many. The image structuring unit 106 may determine many frames are linked to one shot because each of the frames has the same or similar camera viewpoint. This often occurs when a landscape scene is filmed, or when a camera is focused on a human face or object for an extended period of time. On the other hand, the image structuring unit 106 may determine only a few frames are linked to one shot. This often occurs when a camera pans or zooms a great deal during an action sequence associated with motion image data.

After the image structuring unit 106 assembles a plurality of shots, groups of shots from this plurality are assembled into scenes. Therefore, a scene is comprised of at least one shot derived from motion image data being processed by the motion image processing arrangement 100. The image structuring unit 106 assembles shots by determining if visual similarities are common amongst a number of shots. Similarities between consecutive shots are considered by the structuring unit 106. For example, a plurality of shots that all have the same background scenery, and/or have very close timestamps, may be grouped together to form a scene. This grouping results even if humans, automobiles, or other things vary from shot-to-shot. Therefore, the image structuring unit 106 forms scenes by grouping consecutive shots that have common dominate image features. A group of shots is considered to have a common dominate image feature if the same landscape or background is captured in a plurality of consecutive shots, if the same person or thing is captured in a plurality of consecutive shots, or if a plurality of shots have a common visual color, and so on. Moreover, a group of consecutive shots may be considered to have a common dominate image feature if the shots have similar visual motion. This often occurs in video action sequences.

The image structuring unit 106 is also capable of assembling a plurality of consecutive scenes to create one or more chapters. The image structuring unit 106 may be programmed to collect a predetermined number of the consecutive scenes, and this collection of consecutive scenes will be one chapter.

Other techniques for forming one or more chapters from a plurality of scenes may also be used by the image structuring unit 106.

In accordance with the above, an output 108 from the image structuring unit 106 includes motion image data structured as a plurality of shots, scenes and chapters. (The output 108 is illustrated in greater detail in FIG. 4.) The output 108 is received by a semantic description unit 110. The semantic description unit 110 analyzes each shot, scene and chapter of the output 108 and assigns a semantic description to each one of these elements (i.e., shots, scenes and chapters). The semantic description relates generally to the structure or the semantics of the image data being analyzed by the description unit 110. Structure-based semantic descriptions are typically defined in terms of video segments that represent physical, spatial and/or temporal features of the content, such as regions, scenes, shots, and the relationships among them. The details of the video segments are typically described in terms of signals, e.g., color, texture, shape, motion, etc. The semantic-based descriptions of image data generally describe the image data in terms of what it depicts, such as objects, people, events, and their relationships.

Depending on user domains and applications, the image data being analyzed can be described using different types of features, tuned to the area of application. For example, the image data can be described at a low abstraction level using descriptions of such image data features as objects shapes, sizes, textures, colors, movements and positions. At a higher abstraction level, a description scheme may provide conceptual information about the reality captured by the image data, such as information about objects and events and interactions among objects. The semantic description unit 110 determines higher abstraction semantics based on the genre of the motion image data being processed by the motion image processing arrangement 100.

Therefore, each shot, scene and chapter of the output 108 may be assigned one or more low abstraction level attributes chosen from the following descriptive labels: indoor/outdoor, cityscape/landscape, mountain, beach, sea, river, building, house, person, face, etc. Furthermore, depending on the genre associated with the shots, scenes and chapters, the semantic description unit 110 may assign one or more high abstraction level attributes to each of the motion image data elements. Example high abstraction level attributes include those that are related to sporting events, concerts, or other events that include attributes that are documented as occurring frequently.

Figure 4:
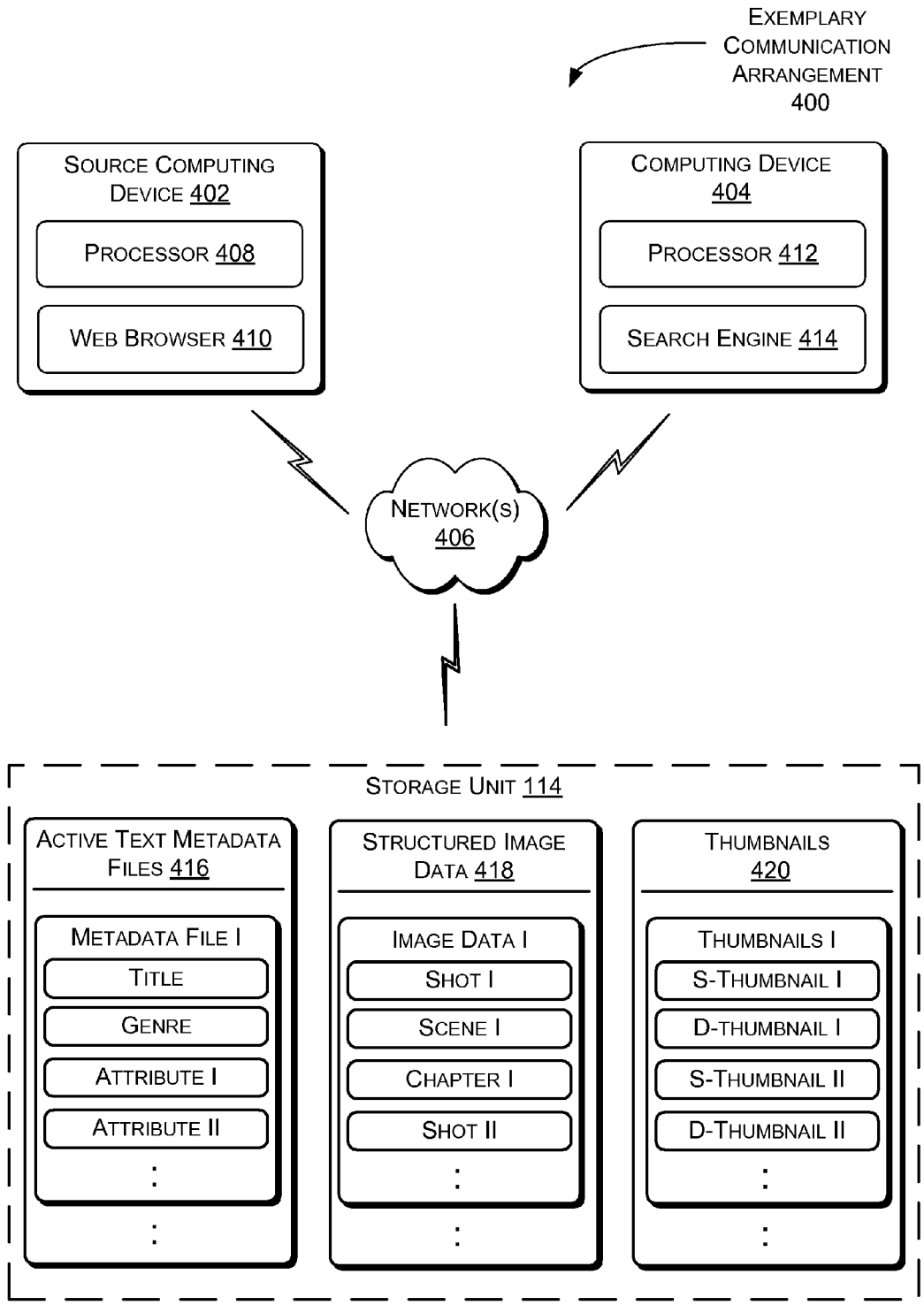
FIG. 4 illustrates an exemplary arrangement that includes a source computing device in communication with a computing device. The computing device includes a search engine that is capable of searching active text metadata files stored in a storage unit.

The low and/or high abstraction level attributes assigned to each shot, scene and chapter are sent to the annotation unit 111. The semantic description unit 110 also sends the output 108 to a storage unit 114. The annotation unit 111 associates the low and/or high abstraction level attributes with a metadata file that contains active text metadata that relates to motion image data processed by the image processing arrangement 100. An exemplary metadata file is illustrated in FIG. 4. In general, metadata files created by the annotation unit 111 include genre data, low abstraction level attributes and high abstraction level attributes associated with shots, scenes and chapters derived from motion image data processed by the image processing arrangement 100. These data and attributes comprise the active text metadata that is searchable using a conventional text-based search engine. Metadata files generated by the annotation unit 111 may be stored in the storage unit 114.

The thumbnail unit 112 also generates one or more thumbnails for each of the shots, scenes and chapters received from the semantic description unit 110. Again, these thumbnails may be static or dynamic. A static thumbnail includes a still image generated from an associated shot, scene, or chapter. A dynamic thumbnail includes multiple images generated from an associated shot, scene, or chapter, which are then played in a continuous loop so that the thumbnail appears animated. In an alternative implementation, the thumbnail unit 112 is implemented after the image structuring unit 106.

To generate a representative static or dynamic thumbnail for a given shot, scene, or chapter, the thumbnail unit 112 analyzes image data associated with the shot, scene, or chapter to identify frames that have coherent camera motions, consistent appearances, and good image content quality. More generally, the thumbnail unit 112 attempts to identify image frames that fall within a defined set of image quality criteria. One or more image frames that fall within such a defined set of image quality criteria are chosen by the thumbnail unit 112 for use as static and/or dynamic thumbnails. The thumbnails may be stored in the storage unit 114.

The annotation unit 111 may be linked to a user interface that facilitates entry of additional information that may be used to augment metadata generated by the image categorizer 102 and the semantic description unit 110. Such a user interface may allow users to view shots, scenes and chapters created by the image structuring unit 106. Simultaneously, the user interface may display and allow editing of metadata associated with the viewed shots, scenes, and/or chapters. Allowing users to review and edit metadata generated by the image categorizer 102 and the semantic description unit 110 may increase the accuracy of search results generated from query of the metadata linked to the shots, scenes and/or chapters. Furthermore, such a user interface may employ technology that captures audio (e.g., speech) and text (e.g., closed-captioning) of processed motion image data. A user of the user interface may use the captured information to further augment the metadata generated by the image categorizer 102 and the semantic description unit 110. In general, the additional data for augmenting the metadata may be incorporated therein using machine learning technologies.

After motion image data associated with video content is processed by the units 102, 106, 110, 111 and 112, the storage unit 114 includes active text metadata stored in a metadata file that pertains to the processed motion image data. The active text metadata may include genre data representative of the processed motion image data, and low and/or high abstraction level semantic attributes assigned to each shot, scene and chapter derived from the processed motion image data. The active text metadata stored in the metadata file may be queried using a text-based search engine. The text-based search engine may also use the structured image data and/or the thumbnails stored in the storage unit 114 as visual search results related to a given search query. More specifically, if keywords of a search query match active text metadata stored in the metadata file, the search engine may retrieve related thumbnails for display on a client computing device. These thumbnails may function as hot-links to underlying structured image data (e.g., shots, scenes and/or chapters.)

The metadata generated by the motion image processing arrangement 100, coupled with other information, may be used by text-based search engines to appropriately rank search results obtained from querying contents of the storage unit 114. Such other information may include a filename and a title of motion image data processed by the image processing arrangement 100. Additional information that may be used to rank search results includes considering Web page text that has one or more references to the motion image data processed by the arrangement 100, and considering other links associated with Web pages that have one or more references to the motion image data. Semantic attributes generated by the semantic description unit 110 may also undergo analysis to produce assigned confidence measurements. These confidence measurements may be used by text-based search engines as part of a comprehensive decision process used to determine the ranking and organization of video search results.

Again, the units illustrated in FIG. 1 may be implemented as software or computer-executable instructions stored in a memory of a client(s)/server(s) and executed by one or more processors of the client(s)/server(s). The memory may be implemented as non-removable persistent storage of the clients/servers, although other suitable computer storage media may also be used to store the modules and repositories. An example of a computer device is provided below with reference to FIG. 9.

Exemplary Unit Outputs

Figure 2:
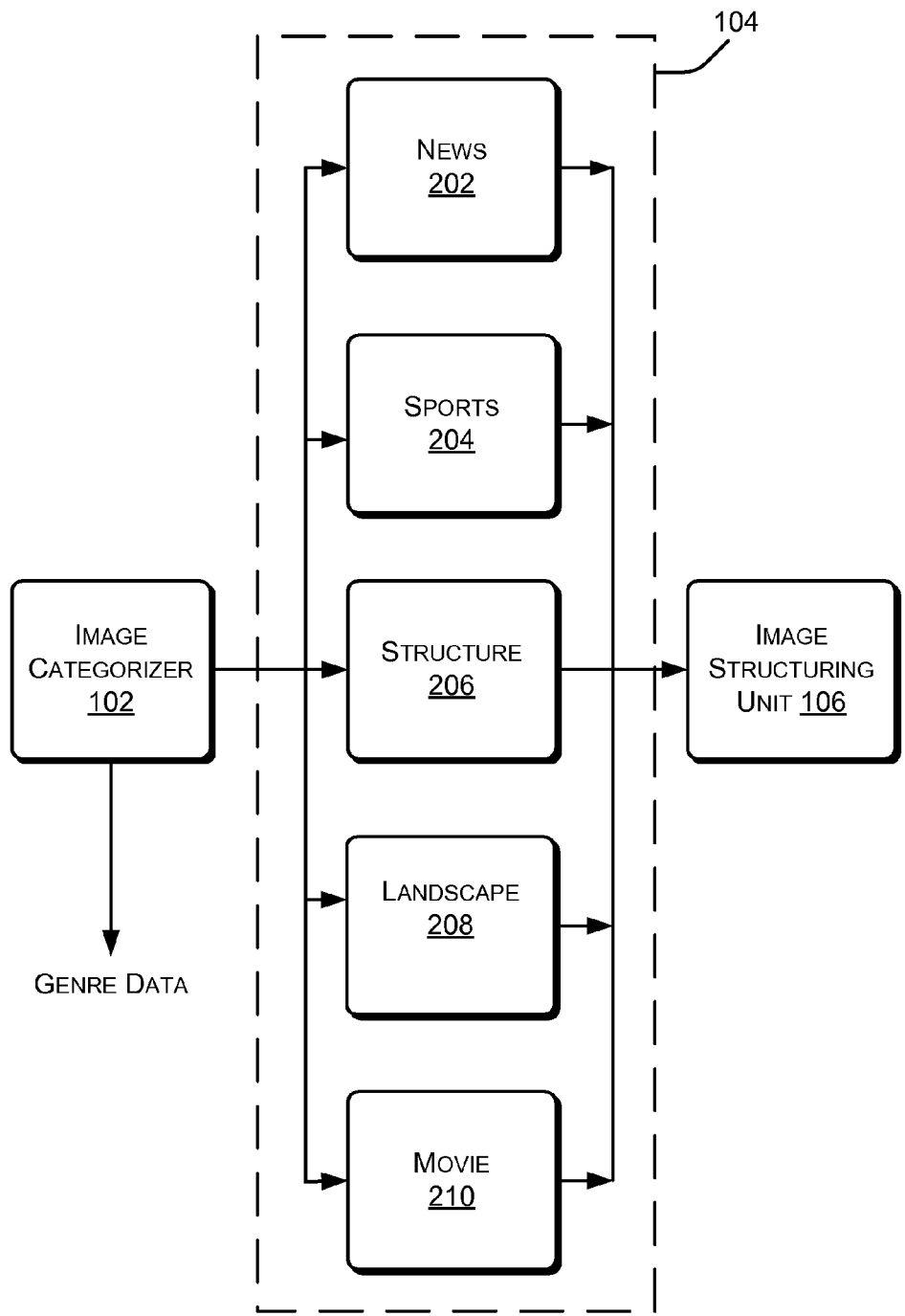
FIG. 2 illustrates exemplary motion image data that may be output from the image categorizer illustrated in FIG. 1.

FIG. 2 illustrates a number of exemplary outputs that the image categorizer 102 may generate after processing motion image data. As was discussed, the image categorizer 102 is designed to determine genre data associated with motion image data processed by the motion image processing arrangement 100. This genre data may include a general genre and several subclass genres. FIG. 2 shows the image categorizer is capable determining motion image data is one of the following genres: news 202, sports 204, structure 206, landscape 208, or movie 210. The given genres are exemplary. Each of the illustrated blocks 202-210 is representative of motion image data that has been associated with a particular genre. This combined data signal is received by the image structuring unit 106. The genre data may also or alternatively be sent directly to the annotation unit 111.

Figure 3:
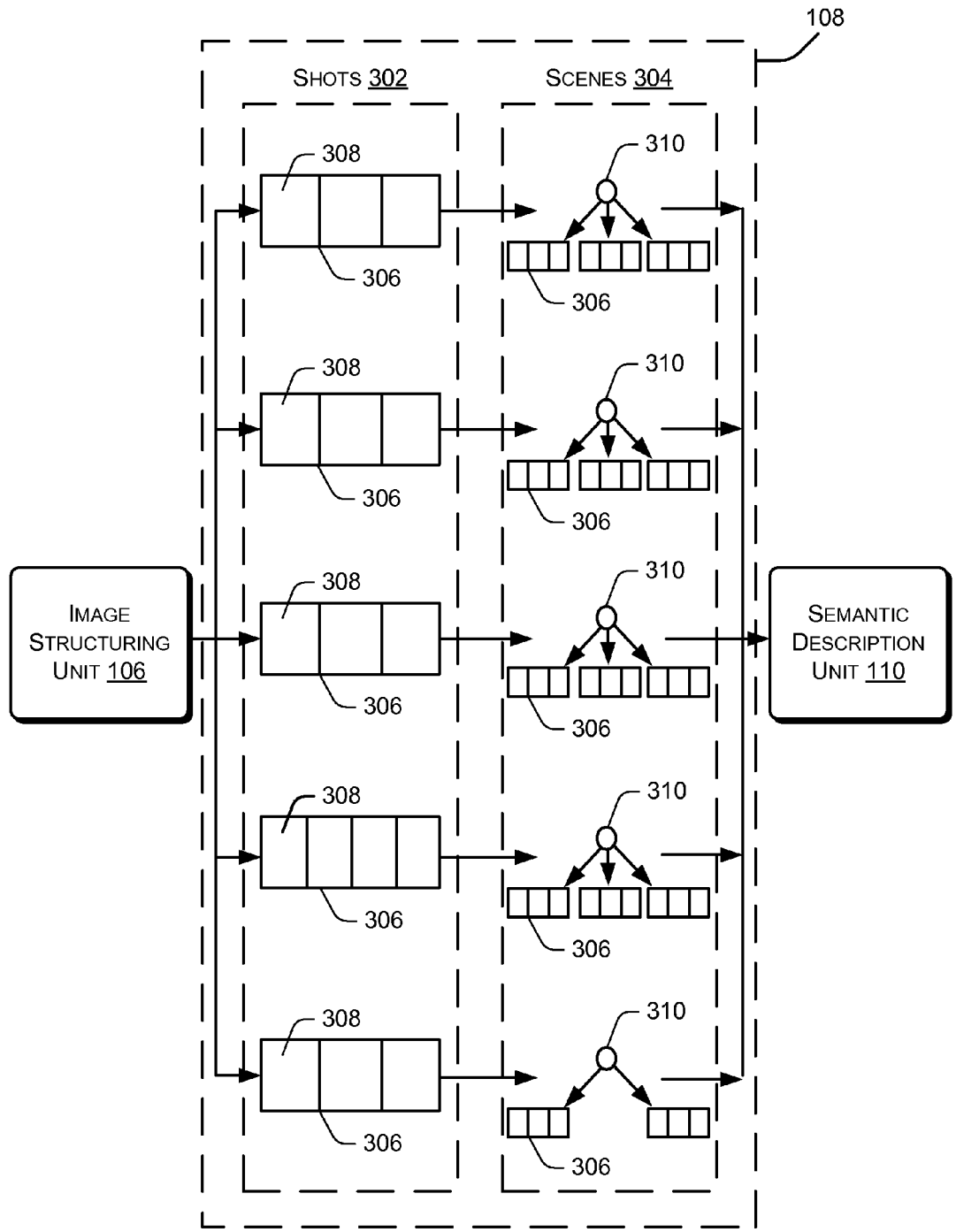
FIG. 3 illustrates exemplary motion image data that has undergone processing by the image structuring unit illustrated in FIG. 1.

FIG. 3 illustrates exemplary shots 302 and scenes 304 that may be output from the image structuring unit 106. Although not shown in the figure, the image structuring unit 106 may also output chapters as well. In the figure, five shots 306 are shown. Each of the shots 306 includes a plurality of image frames 308. The number of image frames 308 associated with each shot 306 may differ in number based on various principles discussed earlier herein. The scenes 304 include five separate scenes 310. Each of the scenes 310 includes a plurality of shots 306 that are comprised of a plurality of image frames 308 derived from motion image data processed by the image structuring unit 106. The output 108 illustrated in FIG. 3 is derived from motion image data associated with video content.

Exemplary Communication Arrangement

FIG. 4 illustrates an exemplary arrangement 400 that includes a source computing device 402 in communication with a computing device 404. The devices 402 and 404 may make use of the active text metadata, structured image data and thumbnails produced by the arrangement 100 illustrated in FIG. 1. The communication between the computing devices 402 and 404 is facilitated through a network 406. The network 406 is representative of many different types of networks, such as cable networks, the Internet, and wireless networks. The computing devices 402 and 404 may be personal computers, wireless phones and tablet computers, but may also be implemented as other devices, such as set-top boxes, game consoles, laptop computers, portable digital assistants (PDA), servers and so forth. An example of a computer device that may be used to realize devices 402 and 404 is illustrated in FIG. 9.

The source computing device 402 is equipped with one or more processors 408 and memory to store applications and data. A browser application 410 may be stored in the memory and executes on a processor to provide access to the network 406. The browser 410 is capable of rendering Web pages that may be retrieved using the network 406. The computing device 404 is equipped with one or more processors 412 and memory to store applications and data. A search engine 414 may be stored in the memory, executes on a processor, and may be interfaced with using a computing device that has access to the network 406.

The search engine 414 may be a text-based search engine that is capable of processing keyword queries from one or more computing devices. Such a computing device includes the source computing device 402. In response to a keyword query related to motion image data, the computing device 404 may interface with the storage unit 114 to search active text metadata files 416. In one exemplary implementation, a metadata file I includes title, genre, and attribute I and II fields. The title field includes the title of motion image data that the metadata file I is associated with, the genre filed includes genre data that was determined by the image categorizer 102, and the attribute fields I and II include low or high abstraction level attributes (semantic attributes) generated by the semantic description unit 110. The storage unit 114 may include many stored active text metadata files 416 that comprise title, genre data and one or more semantic attributes.

Each of the active text metadata files 416 is linked to structured image data 418. As is illustrated in FIG. 4, the structured image data 418 may include many shots, scenes and chapters (e.g., shot I, scene I, chapter I, shot II, . . . ) clustered together to form image data (e.g., image data I). Low or high abstraction level attributes included in a metadata file may be linked to structured image data. For example, attribute I may be linked to shot I, scene I and chapter I, and attribute II may be linked to shot II, and so on. The image data I may be linked to thumbnails I that are included in a plurality of thumbnails 420. These thumbnails I may include both static and dynamic thumbnails (e.g., static (s) thumbnails I & II and dynamic (d) thumbnails I & II).

The search engine 414 may query the storage unit 114 using keywords pertaining to sought-after motion image data. The keywords are compared against metadata included in the active text metadata files 416. If matching metadata is found, structured image data 418 and associated thumbnails 420 may be retrieved by the computing device 404 and communicated to the source computing device 402 for display on a display device. One or more of the user interfaces discussed in the following may be used to display the structured image data 418 and the associated thumbnails 420.

Exemplary User Interfaces

Figure 5:
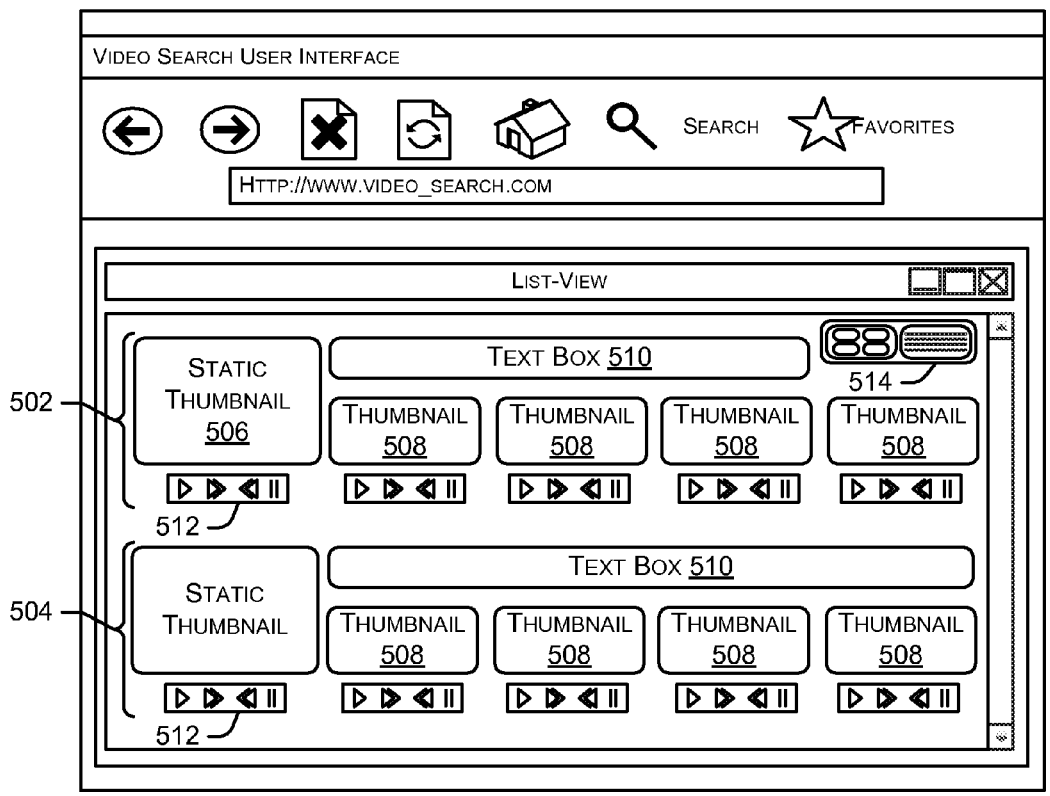
FIGS. 5-7 illustrate exemplary user interfaces displayable on a display device interfaced with a computing device of FIGS. 4 and 9.
Figure 6:
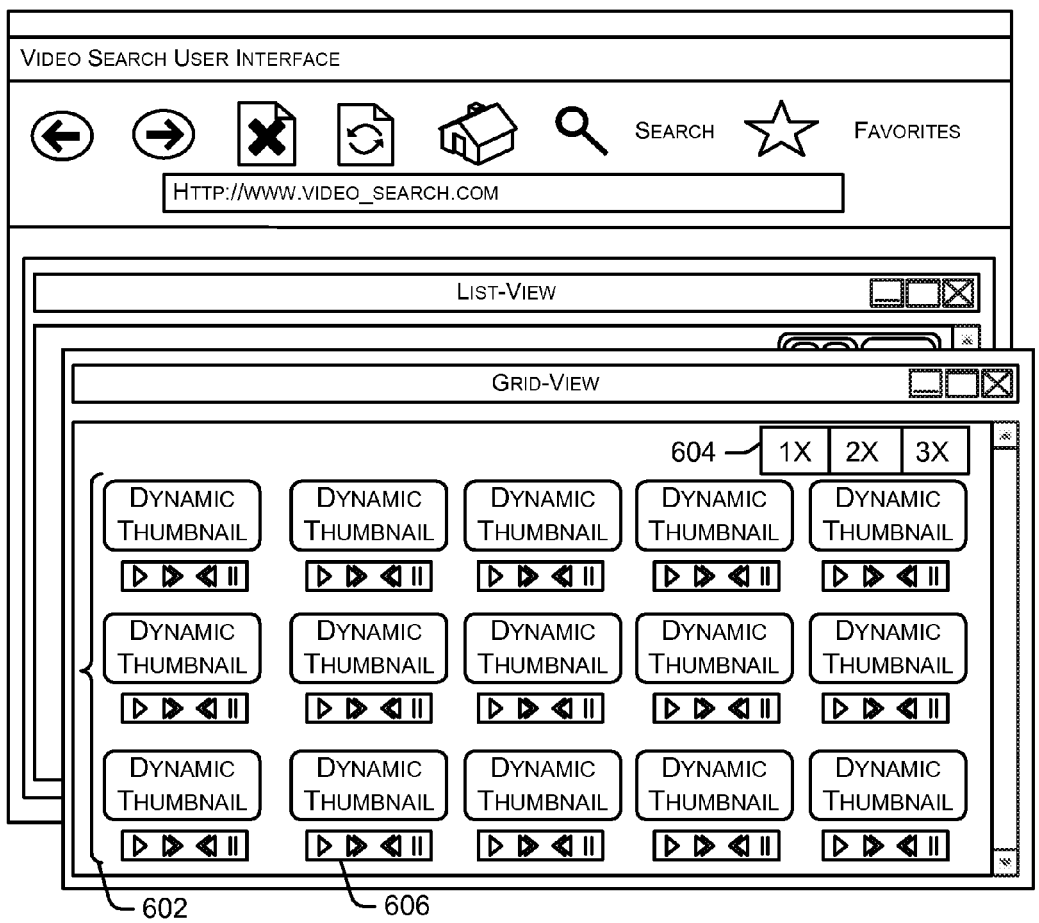
Figure 7:
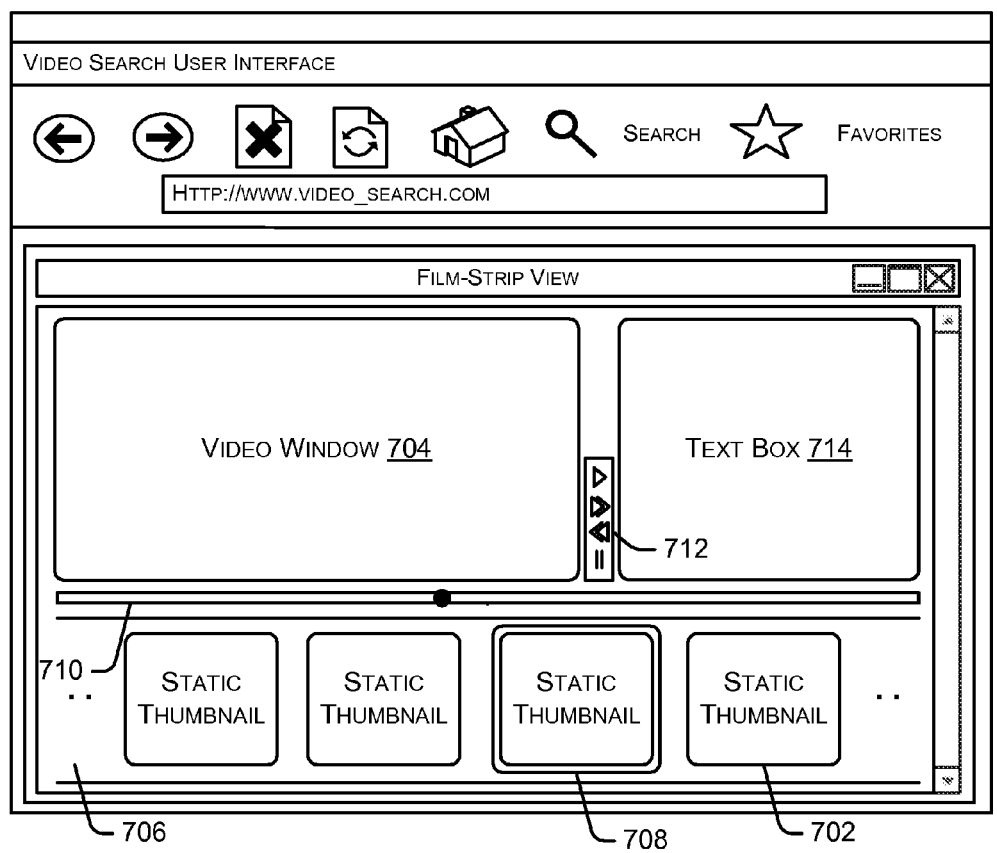

FIGS. 5-7 illustrate exemplary user interfaces displayable on a display device interfaced with a client computer or other computing device. Such a display device may be an appropriate computer display (e.g., an LCD or CRT display), a television, or the like. The user interfaces may be realized by computer-executable instructions stored in a memory of a computing device and executed by one or more processors of the computing device. Realized user interfaces may be communicated to computing devices over a network, such as the Internet, in the form of Web pages or other graphic formatted files.

The user interfaces illustrated in FIGS. 5-7 may be utilized by entities employing search engines, or the like, to display both static and dynamic thumbnails, and associated structured image data. Such thumbnails include those generated by the thumbnail unit 112, or in an alternative embodiment, the thumbnails include those generated by the image structuring unit 106. The structured image data may be generated by the image structuring unit 106. The user interfaces may be communicated to computing devices as Web pages for display on a display device.

FIG. 5 illustrates an exemplary list-view user interface 500 that includes video search results displayed using static and dynamic thumbnails. Two sets of search results (502 and 504) are shown in the figure. The number of sets shown in the figure is by way of example only. Each set of search results includes a static thumbnail 506 and four dynamic thumbnails 508. Alternatively, each set of search results includes five static thumbnails 506 that are linked to corresponding dynamic thumbnails. Any number of static and dynamic thumbnails may be used with the list-view interface 500. The static thumbnails 506 and the four dynamic thumbnails 508 associated with each set 502 and 504, respectively, are linked to a particular motion image data. For example, the thumbnails in the set 502 may be linked to a movie, while the thumbnails in the set 504 may be linked to a television show. Therefore, when a thumbnail is clicked on using a mouse pointer or the like, linked motion image data may be played.

The sets of search results 502 and 504 may also include a text box 510. The text box 510 may include information pertaining to the motion image data depicted by the thumbnails 506 and 508. Playback controls 512 may be linked to each thumbnail 506 and 508. A corresponding action is initiated when one of the playback controls 512 is actuated. For example, when the play button is clicked, corresponding motion image data represented by a given thumbnail is played. For the static thumbnails 506, actuation of one of the playback controls 512 may require a hosting computing device to download a dynamic thumbnail that corresponds to a selected static thumbnail. The list-view user interface 500 may include a list-view/grid-view toggle switch 514. Clicking on the toggle switch changes how the video search results of a selected set of search results are displayed.

FIG. 6 illustrates an exemplary grid-view user interface 600 that includes video search results displayed using static and/or dynamic thumbnails 602. The user interface 600 may include a selection box 604 that can be used to modify the number of thumbnails 602 displayed. Currently, the 3X button is selected. If the 1X button is selected, five thumbnails 602 are displayed. If the 2X button is selected, ten thumbnails 602 are displayed. The user interface 600 may also be implemented with a 4X button that displays twenty thumbnails when selected. The user interface 600 may be implemented to display 6, 12, 24, or 36 thumbnails as well, or any other combination of thumbnails as required and/or desired due to implementation requirements. The user interface 600 also includes playback controls 606 to active/deactivate motion image data associated with the dynamic thumbnails 602.

FIG. 7 illustrates an exemplary film-strip view user interface 700 that includes video search results displayed using static thumbnails 702 and a video window 704. The static thumbnails 702 may be linked to shots, scenes or chapters derived by the image structuring unit 106. This is true of the thumbnails discussed in connection with the user interfaces 500 and 600 as well. The static thumbnails 702 may be displayed in a window 706. The static thumbnails 702 scroll from left-to-right or right-to-left as motion image data in the video window 704 progresses forward or backward time wise.

A thumbnail that corresponds to a motion image data currently displayed in the video window 704 may be highlighted. This is shown by an outline box 708. The thumbnail highlighted may change rapidly or less rapidly depending on the type of static thumbnail (i.e., shot, scene, or chapter) displayed in the window 706. A user of the interface 700 may also manipulate the playback of motion image data playback using a playback slide-strip 710 and playback controls 712. A text box 714 may include information pertaining to the motion image data displayed in the video window 704.

Exemplary Process

Figure 8:
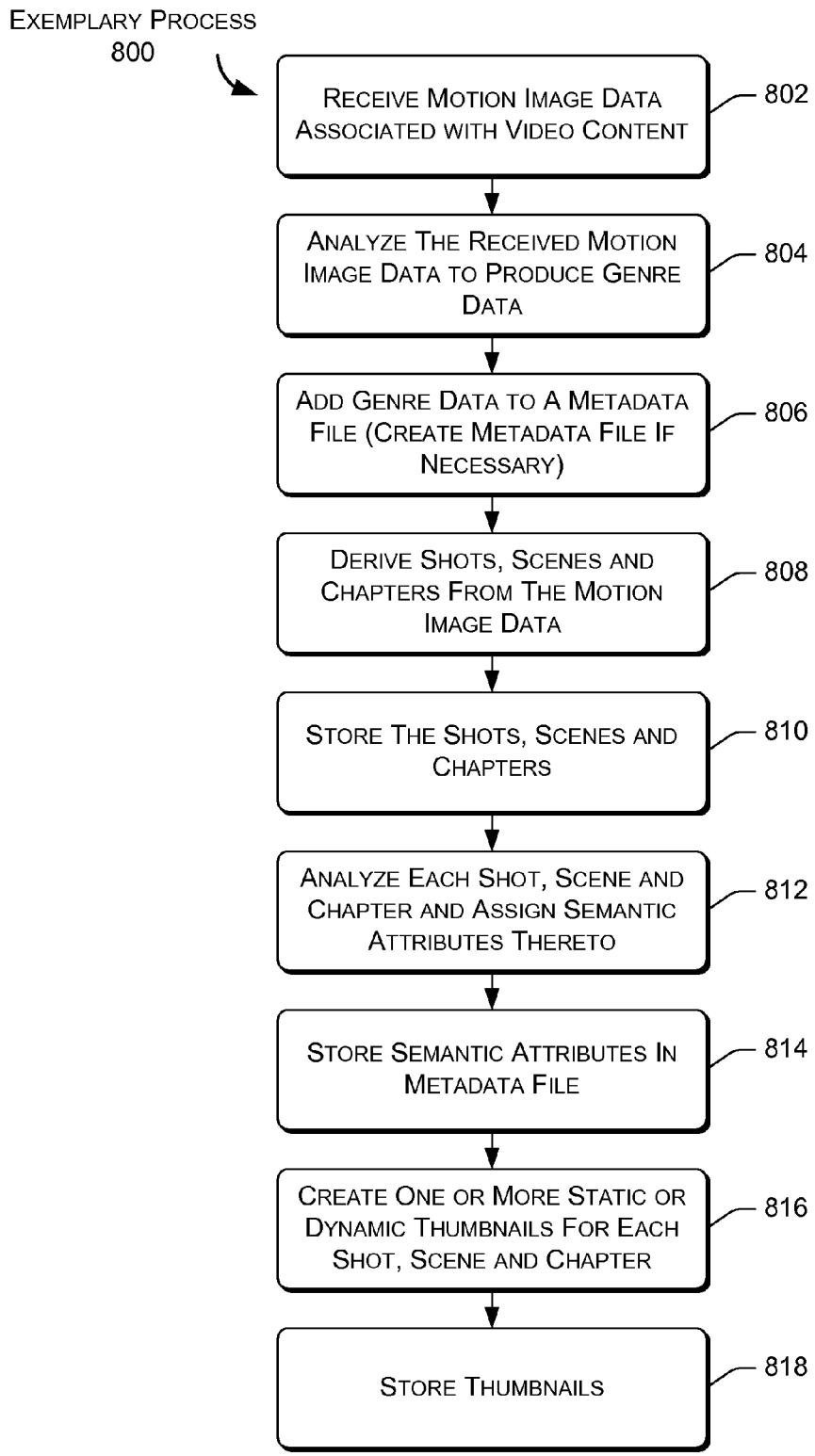
FIG. 8 illustrates an exemplary process that may be used to prepare motion image data for search by a text-based search engine.

FIG. 8 illustrates an exemplary process 800 that may be used to prepare motion image data for search by a text-based search engine. The process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes may be described with reference to the motion image processing arrangement 100 of FIG. 1. Reference may also be made to the computing devices illustrated in FIG. 4.

Referring to FIG. 8, at block 802, the motion image processing arrangement 100 receives motion image data that may be associated with television programs, such as, news shows, movies, sitcoms, comedies, talk shows, sporting events, and so on. At block 804, genre data is produced after analyzing the received motion image data. As was described above, genre data may include a general genre and one or more subclass genres. The image categorizer 102 is capable of generating the genre data associated with the received motion image data.

At block 806, the genre data is added to a metadata file that is linked to the received motion image data. If necessary, a metadata file is created that is used to store data related to the received motion image data. The annotation unit 111 may be responsible for creating and adding data to metadata files associated with motion image data.

At block 808, shots, scenes and chapters are derived from the motion image data. As discussed, the image structuring unit 106 analyzes the received motion image data to produce the shots, scenes and chapters. At block 810, the shots, scenes and chapters are stored in a storage unit (e.g., storage unit 114). At block 812, each shot, scene and chapter is analyzed and assigned at least one or more low and/or high abstraction level attributes (semantics). The semantic description unit 110 is capable of such analysis and assignment of semantics in relation of shots, scenes and chapters derived from the received motion image data. At block 814, the determined semantic attributes are associated with the metadata file that is linked to the received motion image data. This is the same metadata file that includes the genre data.

At block 816, one or more static or dynamic thumbnails are created for each of the shots, scenes and chapters derived from the received motion image data. As described above, the thumbnail unit 112 is capable of creating such thumbnails. At block 518, the thumbnails are stored in the storage unit 114.

The described process creates active text metadata files that have contents associated with structured image data and thumbnails that may be used to display underlying structured image data. A text-based search engine may query these active text metadata files with user-provided keywords. If one or more of the keywords match metadata stored in the searched active text metadata files, thumbnails linked to shots, scenes and chapters may be retrieved and displayed on a display device interfaced with a computing device. Clicking on the thumbnails will cause shots, scenes or chapters to be displayed and considered by a user of the computing device.

Exemplary Computing Device

FIG. 9 is an illustrative computing device that may be used to implement the computing devices discussed herein. In a very basic configuration, the computing device 900 includes at least one processing unit 902 and system memory 904. Depending on the exact configuration and type of computing device 900, the system memory 904 may be volatile (such as RAM), non-volatile (such as ROM and flash memory) or some combination of the two. The system memory 904 typically includes an operating system 906, one or more program modules 908, and may include program data 910.

For the present implementations, the program modules 908 may realize the motion image arrangement 100. Other modules described herein may also be part of the program modules 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 920 and non-removable storage 922. Computer storage media may include volatile and nonvolatile, removable and non-removable media implemented in any method or technology for storage of information, such as computer readable instructions, data structures, program modules, or other data. The system memory 906, removable storage 920 and non-removable storage 922 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of the device 900. Computing device 900 may also have input device(s) 924 such as keyboard, mouse, pen, voice input device, and touch input devices. Output device(s) 926 such as a display, speakers, and printer, may also be included. These devices are well know in the art and need not be discussed at length.

The computing device 900 may also contain a communication connection 928 that allow the device to communicate with other computing devices 930, such as over a network like network 406 of FIG. 4. Communication connection(s) 928 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device, comprising:
   one or more processors;
   a memory accessible by the one or more processors;
   an image categorizer, wherein the image categorizer receives motion image data, classifies the received motion image data as a particular genre, and forwards the classification of genre to an annotation unit;
   an image structuring unit, wherein the image structuring unit structures received motion image data into distinct categories derived from the motion image data, wherein the distinct categories comprise shots, scenes, and chapters;
   a semantic description unit, wherein the semantic description unit analyzes each shot, scene, and chapter;
   the annotation unit, wherein the classification of genre is received and a metadata file is generated;
   wherein the metadata file is generated by the annotation unit and stored in the memory, the metadata file including active text metadata derived from motion image data, the metadata including at least a genre associated with the motion image data and a semantic attribute related to the motion image data, wherein the semantic attribute is output by the semantic description unit, and
   wherein the metadata facilitates text-based searching operations to locate one or more motion image data associated with the metadata, wherein the genre has at least one of a plurality of genre subclasses, and wherein the semantic attribute corresponds to what the image data depicts including relationships between semantic objects.

2. The device of claim 1, wherein the semantic attribute is either at least one of a plurality of low abstraction level or at least one of a plurality of high abstraction level semantic attributes determined from analysis of the motion image data, wherein low abstraction level semantic attributes are chosen from descriptive labels, and wherein high abstraction level semantic attributes are assigned responsive to the associated genre.

3. The device of claim 1, wherein at least one of the plurality of video components is linked to metadata stored in the metadata file.

4. The device of claim 1, wherein a thumbnail unit is implemented as part of the annotation unit data.

5. The device of claim 4, wherein the thumbnails include both static and dynamic thumbnails, wherein each of the dynamic thumbnails facilitate dynamic presentation in a space equivalent to each of the static thumbnails.

6. A computing device interfaced with the metadata file stored in the memory according to claim 1, the interfaced computing device including a text-based search engine embodied as computer-executable instructions, the text-based search engine usable to search the metadata stored in the metadata file.

7. A method implemented at least in part by a computing device, the method comprising:
  assigning genre data to motion image data, wherein the genre has at least one of a plurality of genre subclasses;
  deriving a plurality of shots and scenes from the motion image data;
  assigning, via a semantic description unit, at least one semantic attribute to each shot and scene, wherein the assigned semantic attribute is determined based on analysis performed by the semantic description unit and corresponds to what the image data depicts including relationships between semantic objects; and
  generating a searchable metadata file that is associated with the motion image data, the searchable metadata file including the genre data and the semantic attributes, wherein the genre data and the semantic attributes facilitate text-based searching operations to locate motion image data associated with the searchable metadata file.

8. The method of claim 7, wherein the assigning act assigns at least one of a plurality of low abstraction level or at least one of a plurality of high abstraction level semantic attributes determined from analysis of the motion image data, wherein low abstraction level semantic attributes are chosen from descriptive labels, and wherein high abstraction level semantic attributes are assigned responsive to the associated genre.

9. The method of claim 7, wherein the shots include at least one frame taken from the motion image data.

10. The method of claim 7, wherein the scenes include at least one shot derived from frames of the motion image data.

11. The method of claim 7, further comprising creating at least one thumbnail tat is linked to each of the plurality of shots and scenes.

12. The method of claim 11, wherein each created thumbnail is one of a static and a dynamic thumbnail, wherein each of the dynamic thumbnails facilitate dynamic presentation in a space equivalent to each of the static thumbnails.

13. A user interface us cable with one or more computing devices, the user interface capable of displaying at least content related to video search results, the interface comprising:
  a rendering of search results such that:
    in an event that a search is directed to video, the interface interacts with a video search service, wherein the video search service provides video data comprising a plurality of video components, each video component comprising one of a shot, a scene, and a chapter, and each of the shot, the scene, and the chapter being derived from motion image data, the motion image data having been:
      categorized as a particular genre, the associated genre having been saved as part of metadata associated with the motion image data;
      structured into distinct categories comprising shots, scenes, and chapters;
      stored as thumbnail representations, wherein the thumbnail representations are derived from the motion image data and at least one of the thumbnails is associated with a delimited portion of the motion image data; and
      automatically analyzed and assigned a semantic attribute for each of the plurality of video components, the semantic attributes having been saved as part of metadata associated with the motion image data, whereby the semantic attributes facilitate organization of video search results by text-based search engines;
      in an event that the semantic attributes have been assigned a confidence measurement for each of the plurality of video components, the semantic attributes having been analyzed to produce the confidence measurements; and
      determining based at least in part on the confidence measurements the organization of the video search results by text-based search engines; and
  a plurality of thumbnails associated with the motion image data, at least one of the plurality of thumbnails being a static thumbnail, wherein the static thumbnail comprises a still image generated from the associated shot, scene, or chapter, and at least one of the plurality of thumbnails being a dynamic thumbnail, wherein the dynamic thumbnail comprises multiple images generated from the associated shot, scene, or chapter causing the thumbnail to appear animated, and wherein each of the dynamic thumbnails facilitate dynamic presentation in a space equivalent to each of the static thumbnails;
  a metadata area, wherein the metadata area facilitates user review and user editing of metadata to augment the metadata generated by the video search service; and
  a view selection button usable to toggle to a window capable of displaying a plurality of dynamic thumbnails associated with motion image data.

14. The user interface of claim 13, wherein the window displays the plurality of dynamic thumbnails in grid format.

15. The user interface of claim 13, wherein the window displays the phirarity of dynamic thumbnails in a grid of 6, 12, 24, or 36 dynamic thumbnaits that are all linked to the common motion image data.

16. The user interface of claim 13, wherein the static thumbnail is associated with a window of the user interface, the remaining thumbnails of the plurality of thumbnails being dynamic thumbnails.

17. The user interface of claim 13, further comprising a text box to include textual information associated with at least one of the plurality of thumbnails.

18. The user interface of claim 13, further comprising playback controls associated with each of the plurality of thumbnails.

19. The user interface of claim 13, further comprising a set of thumbnails, the set of thumbnails including one static thumbnail and five dynamic thumbnails, each of the thumbnails in the set linked to common motion image data.

* * * * *

UNITED STATES PATENT AND TRADEMARK OFFICE
CERTIFICATE OF CORRECTION

PATENT NO.         : 7,421,455 B2                                    Page 1 of 1
APPLICATION NO.    : 11/276364
DATED              : September 2, 2008
INVENTOR(S)        : Hua et al.

It is certified that error appears in the above-identified patent and that said Letters Patent is hereby corrected as shown below:

In column 12, line 65, in Claim 4, after "unit" delete "data." and insert -- . --, therefor.

In column 13, line 40, in Claim 11, delete "tat" and insert -- that --, therefor.

In column 13, line 46, in Claim 13, delete "us cable" and insert -- useable --, therefor.

In column 14, line 43, in Claim 15, delete "phiratity" and insert -- plurality --, therefor.

In column 14, line 44, in Claim 15, delete "thumbnaits" and insert -- thumbnails --, therefor.

In column 14, line 57, in Claim 19, delete "thumbnaits" and insert -- thumbnails --, therefor.

Signed and Sealed this
Third Day of May, 2011

David J. Kappos
*Director of the United States Patent and Trademark Office*